(No Model.)
C. A. BEHLEN.
COMBINED BODY LOOP AND SPRING COUPLING.
No. 572,097. Patented Dec. 1, 1896.
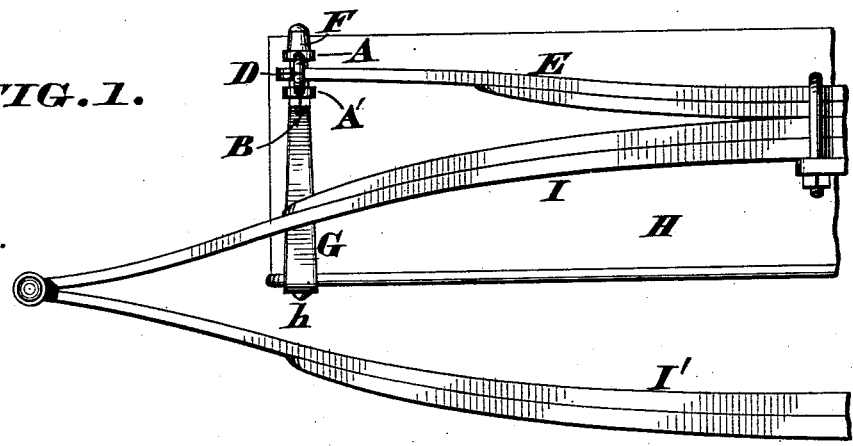
FIG. 1.
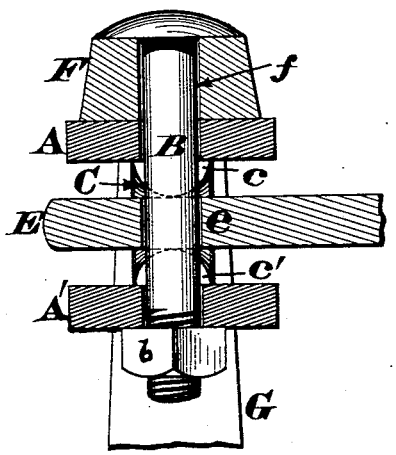
FIG. 2.
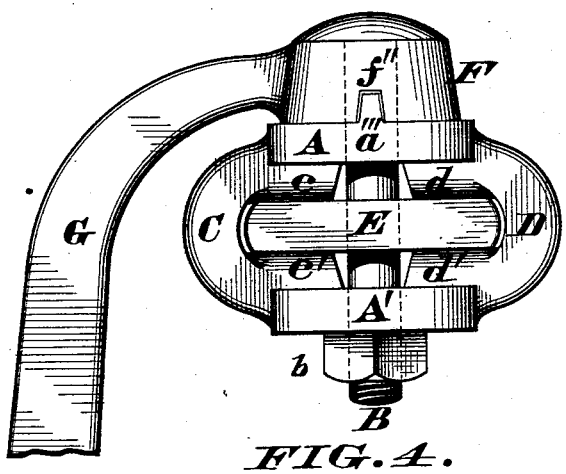
FIG. 3.
FIG. 4.
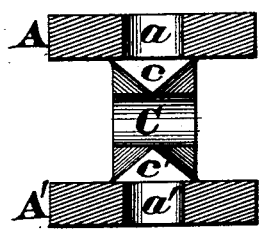
FIG. 5.
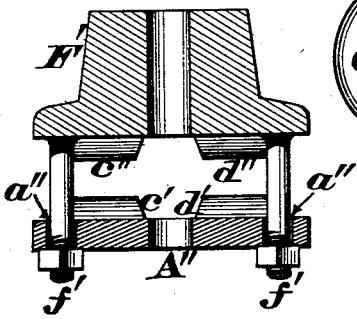
FIG. 6.
Attest.
Ida Hertz
Samuel M. Quinn
Inventor.
Charles A. Behlen.
by James H. Layman
Atty.

UNITED STATES PATENT OFFICE.

CHARLES A. BEHLEN, OF CINCINNATI, OHIO.

COMBINED BODY-LOOP AND SPRING-COUPLING.

SPECIFICATION forming part of Letters Patent No. 572,097, dated December 1, 1896.

Application filed June 22, 1896. Serial No. 596,473. (No model.)

*To all whom it may concern:*

Be it known that I, CHARLES A. BEHLEN, a citizen of the United States, residing at Cincinnati, in the county of Hamilton and State of Ohio, have invented certain new and useful Improvements in a Combined Body-Loop and Spring-Coupling; and I do hereby declare the following to be a full, clear, and exact description of the invention, reference being had to the annexed drawings, which form a part of this specification.

My invention comprises a cheap, simple, and secure device wherewith the upper end of a body-loop can be securely coupled to any form of vehicle-spring, the principal object of the improvement being to prevent the turning or twisting of the lower end of said loop where it is fastened to a carriage or wagon body, as hereinafter more fully described.

In the annexed drawings, Figure 1 is an elevation showing my coupling applied to a well-known arrangement of vehicle-spring. Fig. 2 is an enlarged vertical section of said coupling, taken longitudinally of the supporting-spring. Fig. 3 is a side elevation of the coupling and the upper portion of a body-loop, one end of the aforesaid spring being visible. Fig. 4 is a similar elevation of the coupling detached from said spring and body-loop. Fig. 5 is a vertical section of the detached coupling. Fig. 6 is a section of a modification of the invention.

My coupling includes a pair of plates A A', which usually take the shape of disks and are provided with apertures $a\ a'$, as more clearly seen in Fig. 5, for the passage of a connecting-bolt B, wherewith said coupling is fastened to any approved form of spring and body-loop. These disks are united to each other by branches C D, and the latter have bearings $c\ c'\ d\ d'$, between which the free end of a spring E is inserted, as seen in Fig. 3. Those portions of the bearings in direct contact with the spring may be rounded, as indicated by the dotted lines in Fig. 2, but it is preferred to make them angular or ridge-shaped, as seen in Fig. 5. $e$ is a perforation in the spring E to admit the bolt B, which bolt passes through an eye $f$ in the head F of a body-loop G and is secured in place by a nut $b$.

$h$ in Fig. 1 is one of a number of fasteners wherewith the lower end of the body-loop is attached to a carriage or wagon body H, the direct supporting-spring E of this body being secured to the upper one of a pair of semi-elliptic springs I I'.

In constructing my coupling there should be no material clearance between the sides of the spring E and the inner surfaces of the branches C D, and the bearings $c\ c'\ d\ d'$ of the latter should fit snugly against the top and bottom of said spring, as clearly shown in Fig. 3. Hence as these bearings are disposed transversely of the spring and in line with the center of bolt B, as seen in Fig. 2, it is evident said spring is free to play up and down without imparting any rocking motion to the body-loop G. Consequently said loop will always maintain an erect position, no matter how far the spring may vibrate, and, on this account, there will be no danger of the fastenings $h$ at the lower end of said loop working loose from the body H. It will thus be seen that my coupling overcomes a well-known defect incidental to the ordinary method of hanging body-loops from vehicle-springs and does it in such a way as not to add to the cost of manufacture nor to detract from the finished appearance of a carriage or wagon. The coupling, however, is not limited to the use herein described, but may be applied to any part of a vehicle where it is desired to have one member more in a right line without being affected by the vibrations of a supporting member with which it is connected.

In the modification of my invention seen in Fig. 6 the upper bearings $c''\ d''$ are integral with a body-loop head F', as are also a pair of pins $f'\ f'$, which traverse perforations $a''\ a''$ of the lower plate A'' and have nuts screwed to their extremities. By this arrangement the coupling is "clipped" to the spring, and any wear of the parts can be readily taken up by tightening the aforesaid nuts. Again, Fig. 3 shows that the plate A may have a tooth $a'''$, entering a notch $f''$ in the body-loop head G, so as to hold the coupling squarely across the spring E.

I claim as my invention—

1. As a new article of manufacture, a coupling consisting of the plates A, A', united by branches C, D, having bearings $c, c', d, d'$, as herein described.

2. The combination of perforated plates A $a$, A' $a'$, united by branches C, D, having bearings $c, c', d, d'$, a vibrating member E, inserted between said bearings, and pierced at $e$; a supporting member G, having a head F, resting upon the upper plate A, and provided with an eye $f$; and a bolt B traversing said passages $f, a, e, a'$, and secured with a retainer, as $b$, for the purpose described.

3. A body-loop, or similar supporting member provided with four limited bearings for a spring substantially as herein described.

In testimony whereof I affix my signature in presence of two witnesses.

CHARLES A. BEHLEN.

Witnesses:
JAMES H. LAYMAN,
JOHN C. ROGERS.